Patented Aug. 23, 1932

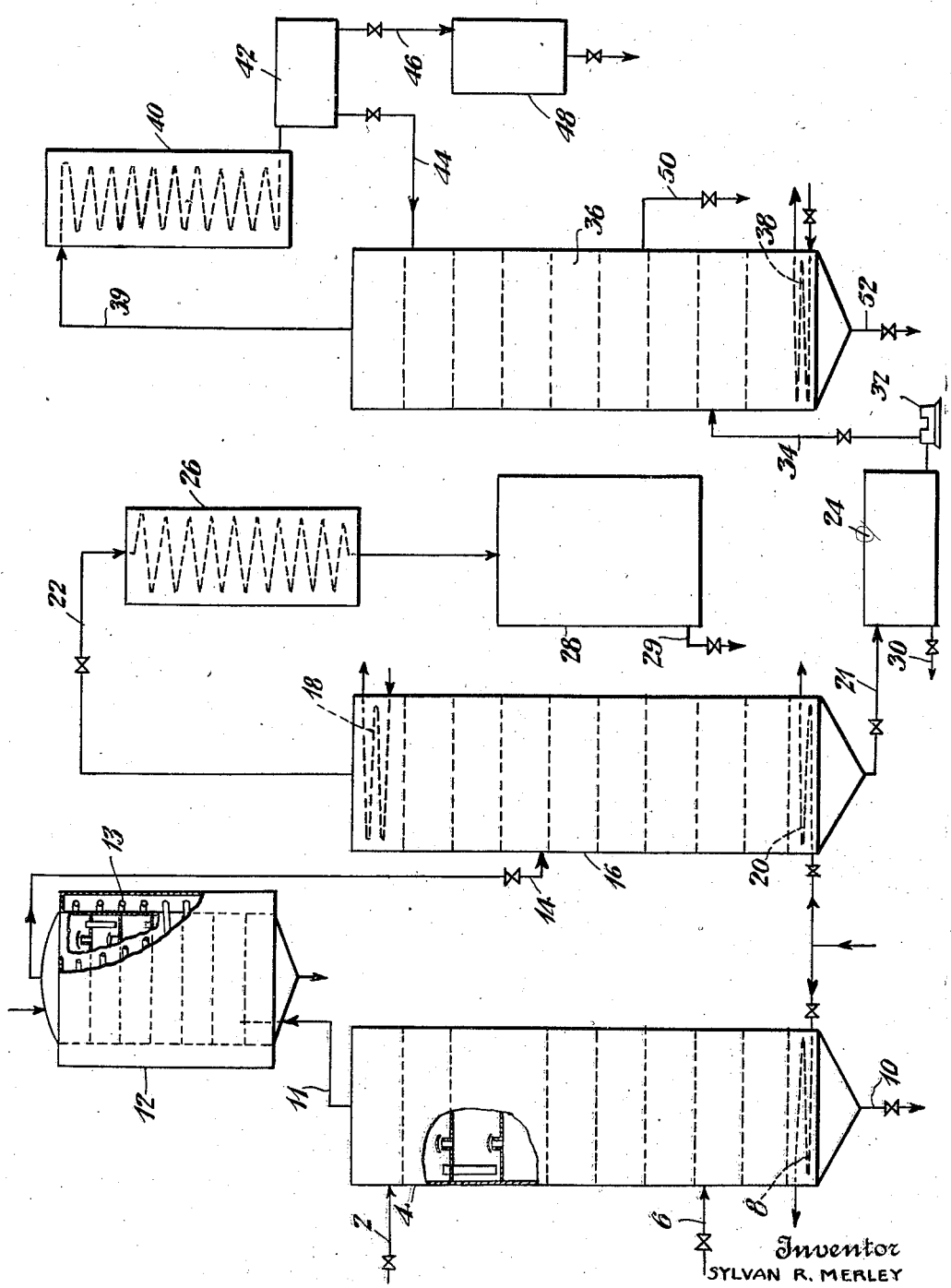

1,873,006

UNITED STATES PATENT OFFICE

SYLVAN R. MERLEY, OF DOVER, NEW JERSEY, ASSIGNOR TO DOHERTY RESEARCH COMPANY, OF NEW YORK, N. Y., A CORPORATION OF DELAWARE

ALCOHOL RECOVERY

Application filed September 30, 1930. Serial No. 485,401.

This invention relates to an improved process for recovering secondary alcohols from a mixture of hydrolyzed alkyl sulfates.

In the art of cracking and refining petroleum oils, much of the still products formed by such process contain olefins. To recover these olefins they are absorbed by a solution of a mineral acid, such as sulfuric acid. The chemical reaction involved in the absorption of these olefins by sulfuric acid results in the formation of alkyl sulfates.

The alkyl sulfates are then hydrolyzed with water under definitely controlled conditions, in the proportion of about one part of the alkyl sulfates to four parts by weight of water to produce a mixture of secondary alcohols and sulfuric acid. Since the olefin containing products obtained from petroleum refining and cracking contain various amounts of ethylene, propylene, butylene, amylene and higher olefins, they become saturated or esterified when combined with sulfuric acid, and when they are hydrolyzed the alcohols formed will contain alkyl radicals corresponding to the radicals of such esters. As a result, therefore, a mixture of alcohols of varied carbon content are obtained by the hydrolysis of corresponding alkyl sulfates.

It is desirable, therefore, to separate the alcohols from the hydrolyzed solution and also to separate the alcohols from each other.

An object of this invention is to provide a process for separating secondary alcohols from a hydrolyzed mixture of alkyl sulfates and from each other without decomposition of such alcohols.

With this object in view, a feature of this invention is that when the secondary alcohols are obtained, there are some alcohols, namely the isobutyl and lower alcohols, which are water soluble, whereas the amyl and higher alcohols are practically insoluble.

A further object of this invention therefore is to separate water-soluble butyl and lower alcohols, i. e., those of less than 4 carbon content, from the practically insoluble amyl and higher alcohols, i. e., those of more than 5 carbon content.

Another object of this invention is to separate secondary butyl and lower alcohols from amyl and higher alcohols, obtained by the hydrolysis of alkyl sulfates, by fractionating these alcohols under definitely controlled distilling conditions.

With these and other objects in view, the invention will be best understood from the following detailed description taken in connection with the accompanying drawing in which:

The figure is a diagrammatic flow sheet of the improved process.

Referring to the drawing, the hydrolyzed solution of alkyl sulfates to be treated is introduced through a valve controlled pipe, 2, into the upper portion of a column still, 4. The column still is of ordinary bubbler tray construction adapted for the proper separation of the vapors from the liquids introduced thereinto. Live steam is introduced into the base of the column through a valve controlled pipe, 6, thus insuring complete hydrolysis of the alkyl sulfates. The steam also carries upward through the column the alcohol vapors formed. The column still, 4, is heated by means of a closed steam coil, 8, located at the base of the column and at a point below the live steam inlet, in order to provide sufficient heat to steam distill the various secondary alcohols resulting from the introduced mixture of hydrolyzed alkyl sulfates. This closed steam coil supplies sufficient heat to keep the alcohols present therein in vapor phase.

The hydrolyzed solution of alkyl sulfates contains besides alcohols, and sulfuric acid, some polymers, hydrogen sulfide, sulfur dioxide and other sulfur compounds which were formed during the saturation of the sulfuric acid and the hydrolysis of the alkyl sulfates. The sulfuric acid and most of the polymers pass to the bottom of the column, 4, during the distillation and are drawn off through a valve controlled conduit, 10.

The mixture of alcohol and water vapors produced in the column, 4, containing impurities from the hydrolyzed alkyl sulfates, is conducted by a vapor line, 11, into a heated caustic scrubbing tower, 12. The caustic scrubbing tower, 12, is of ordinary construction with perforated trays through which a weak solution of caustic soda or potash passes toward the bottom of the tower. The vapors from the distilling column, 4, pass through the scrubbing tower in a stream counter to that of the warm caustic solution, the rate of speed with which these vapors pass through the warm caustic solution depending upon the amount of heat supplied by the closed steam coil, 8, at the bottom of the column 4. The heat supplied by the closed coil, 8, is sufficient to force all vapors upward into the scrubbing tower. The vapors introduced into the scrubbing tower are maintained in vapor phase by heat from a heating coil, 13, arranged in the jacket of the scrubber, 12. As the vapors pass through the warm caustic solution, the sulfur dioxide, polymers, and hydrogen sulfide in the vapors are absorbed by the caustic forming a bisulfate solution which flows to the bottom of the scrubbing tower and is drawn off. By the time the steam-laden alcohol vapors reach the top of the scrubbing tower, they are freed from substantially all impurities after which they are conducted into a second distilling tower 16 through a valve controlled conduit, 14.

The distilling column, 16, is the same type as the column still 4, but is provided with a refluxing coil 18 in the upper portion thereof. Column, 16, is also provided with a closed steam heating coil, 20, for maintaining the desired temperatures in the base of the column. By the use of the coils, 18 and 20, a definite temperature gradient may be maintained from bottom to top of the column.

The vapor mixture conducted through the pipe, 14, is preferably introduced into the mid-portion of column, 16, where the temperature is suitable for maintaining the butyl and lower boiling alcohols in vapor phase, and at the same time permit the condensation of the amyl and higher alcohols which are refluxed down through the column and drawn off through a pipe 21. A cut temperature is maintained on column, 16, by means of coil, 18, such that the butyl and lower boiling alcohols (with water) are taken overhead through a vapor line, 22, condensed in a condenser, 26, and collected in a receiver, 28. The alcohols passing from column, 16, through pipe, 21, are discharged into a tank, 24, from which any water present in the mixture is withdrawn through a valved pipe, 30.

The alcohols in the mixture in the tank, 24, comprises secondary amyl, hexyl, heptyl, octyl, nonyl and other higher alcohols with a slight amount of dissolved water and some high boiling polymers.

In order to separate the secondary amyl alcohol from the higher alcohols, the alcohol mixture is pumped by means of a pump, 32, through a valve controlled conduit, 34, into the lower portion of a distilling column 36, in which the mixture is fractionated. The column still, 36, is of the same construction as the other two columns, 4, and, 16, hereinbefore described, and is so arranged that the vapors and liquids present therein are in equilibrium at any point of the column still, the liquid and vapor at the bottom of the column still being richer in less volatile components than at the top.

The bottom of the column still, 36, is provided with a closed heating coil, 38, through which steam is passed to provide sufficient heat in the still to effect the desired vaporization of the alcohol mixture introduced thereinto. While the alcohol mixture is being introduced into the still, 36, the amyl alcohol vapors rise to the top of the still and pass through a vapor line, 39, into a water cooled condenser, 40, to be condensed and then flow into a trap, 42. Alcohol may be conducted from this trap through a reflux line 44 into the upper part of the still, 36, for the purpose of maintaining the cut temperature therein and alcohol may be conducted through a conduit, 46, to storage tank, 48.

The amyl alcohol collected in the tank, 48, may be dried of any water that may have been carried over during the separation of amyl from the higher secondary alcohols. During the separation of the alcohols, as part of the amyl alcohol flows back into the still, it tends to reduce the temperature in the upper portion of the tower. As a result, the higher alcohols, hexyl, heptyl, etc., are condensed and reflux toward the mid-portion of the still and are drawn off by an outlet, 50. These higher alcohols may be separated by fractional distillation in the usual manner.

The higher alcohol residues and impurities, such as polymers, are drawn off from the bottom of the still, 36, by the valved outlet, 52.

The process of the present invention is particularly important from the standpoint of economy of operation and the purity of the products obtained, especially when it is realized that the polymers and other impurities present in the hydrolyzed mixture of alkyl sulfates are difficult to separate.

Furthermore, by passing alcohol mixtures containing higher and lower alcohols than amyl through a series of fractionating columns as described in this process, the separation of amyl and higher alcohols from butyl and lower alcohols is effected with a shortening of time and an increase of quantity of alcohols.

The process herein described for the separation of higher and lower alcohols may be modified without affecting its fundamental principles. Furthermore, the production of alcohols by a batch or intermittent method, or by a plurality of units of distilling columns operated continuously is contemplated by the present invention.

Having described the invention what is claimed as new is:

1. The process of recovering secondary alcohols from a mixture of hydrolyzed alkyl sulfate which comprises steam distilling a hydrolyzed solution of amyl sulfates containing a mixture of butyl and lower boiling alcohols, amyl and higher alcohols, free sulfuric acid and impurities, passing the vapors from said solution through a caustic solution to remove the impurities and into a refluxing and separating zone in which the butyl and lower boiling alcohol vapors are maintained in vapor state, passed overhead and condensed, while the amyl and higher boiling alcohol vapors are condensed in said zone and drawn off from the bottom thereof, separating the amyl and higher boiling alcohols from any water withdrawn therewith, fractionally distilling the resulting amyl and higher boiling alcohols, and separately collecting the amyl alcohol from the higher boiling alcohols.

2. The method of recovering secondary alcohols from a mixture of hydrolyzed alkyl sulfates which comprises steam distilling a hydrolyzed solution of alkyl sulfate, passing the resulting steam laden vapors through a warm weak caustic solution to remove impurities and to neutralize said vapors, passing the purified vapors into a refluxing and separating zone whereby the steam laden butyl and lower boiling alcohols are kept in vapor phase, carried overhead and condensed while the amyl and higher alcohols are withdrawn from the bottom of said zone, separated from the condensed water and dry distilled in a third zone, the amyl alcohol coming off overhead while the higher alcohols are drawn off at the mid-portion of said zone.

3. The process of recovering secondary alcohols from a mixture of hydrolyzed alkyl sulfates which comprises steam distilling a hydrolyzed solution of alkyl sulfates, purifying and neutralizing the steam distilled alcohol vapors in a warm caustic solution, passing the purified vapors into a refluxing and separating zone in which the butyl and lower boiling alcohol vapors remaining in the vapor phase are passed overhead and condensed and collected while the amyl and higher alcohol vapors are condensed in said zone and withdrawn therefrom, separating any water withdrawn therewith, then dry distilling in another zone to fractionally separate the amyl alcohol which is vaporized from the mixture of higher alcohols condensed, one part refluxing back into the zone while the other portion is collected continuously, until all the amyl is separated from the higher alcohol mixture, the higher alcohols being collected at a mid-portion of said zone.

4. The process of recovering secondary alcohols which comprises steam distilling a solution of hydrolyzed alkyl sulfates containing secondary alcohols up to 10 carbon content, sulfuric acid and impurities, passing the vapors through a warm caustic solution to neutralize and purify them, then separating isobutyl and lower boiling alcohols from amyl and higher boiling alcohols by refluxing said mixtures, maintaining the butyl and lower boiling alcohols in vapor phase, collecting overhead and condensing, while the amyl and higher boiling alcohols condensed with water are withdrawn from the bottom of said zone, separated from the water and fractionally distilled in another zone, whereby the amyl alcohols with water are vaporized, collected overhead and condensed while the higher boiling alcohols are drawn off at a mid-portion of said zone.

5. The improvement in alcohol recovery which comprises steam distilling a hydrolyzed alkyl sulfate solution containing a mixture of high and low boiling alcohols, sulfuric acid and impurities, passing the vapors through weak warm caustic, refluxing and separating the butyl and lower boiling alcohols from the amyl and higher alcohols, separating the amyl from higher boiling alcohols by fractionally distilling and refluxing the higher alcohol mixture in a separating zone, collecting and condensing the amyl alcohol overhead while the higher alcohols remaining in said mixture are drawn off from the mid-portion of said zone.

In testimony whereof I affix my signature.

S. R. MERLEY.